United States Patent
Wei et al.

(10) Patent No.: US 9,258,024 B2
(45) Date of Patent: Feb. 9, 2016

(54) SIM CARD CONNECTOR AND MOBILE TERMINAL

(71) Applicant: HUIZHOU TCL MOBILE COMMUNICATION CO., LTD., Huizhou, Guangdong (CN)

(72) Inventors: Jinping Wei, Huizhou (CN); Jia Wang, Huizhou (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 0 days.

(21) Appl. No.: 14/433,922

(22) PCT Filed: Aug. 5, 2013

(86) PCT No.: PCT/CN2013/080836
§ 371 (c)(1),
(2) Date: Apr. 7, 2015

(87) PCT Pub. No.: WO2014/187030
PCT Pub. Date: Nov. 27, 2014

(65) Prior Publication Data
US 2015/0280766 A1    Oct. 1, 2015

(30) Foreign Application Priority Data

May 21, 2013  (CN) .......................... 2013 1 0191088

(51) Int. Cl.
*H04B 1/38* (2015.01)
*H04B 1/3818* (2015.01)
(Continued)

(52) U.S. Cl.
CPC ............ *H04B 1/3818* (2015.01); *G06K 7/0086* (2013.01); *H01R 12/714* (2013.01); *H01R 13/6691* (2013.01); *H04B 1/3816* (2013.01); *H04M 1/274* (2013.01)

(58) Field of Classification Search
CPC .......................... H04M 1/0249; H04M 1/0254
USPC .......... 439/517, 631, 101, 108, 660; 455/558, 455/557, 575.1, 550.1
See application file for complete search history.

(56) References Cited

U.S. PATENT DOCUMENTS 5,478,253 A * 12/1995 Biechler ............ H01R 12/7005
439/108
5,547,385 A * 8/1996 Spangler ............ H01R 12/7005
439/101
(Continued)

FOREIGN PATENT DOCUMENTS

| CN | 101777709 A | 7/2010 |
| CN | 102548206 A | 7/2012 |

(Continued)

OTHER PUBLICATIONS

English Abstract of CN103001075 A.
(Continued)

*Primary Examiner* — Sonny Trinh
(74) *Attorney, Agent, or Firm* — Ladas & Parry LLP

(57) ABSTRACT

An SIM card connector and a mobile terminal are disclosed. The SIM card connector comprises a card holder as well as a power supply terminal, a first terminal and a second terminal disposed within the card holder. When the SIM card is plugged, the power supply terminal connects with a power supply contact of the SIM card earlier than the first terminal, and the first terminal connects with the power supply contact earlier than the second terminal. The mobile terminal comprises an interruption detection module, a power supply management module and an SIM card connector. The power supply management module is configured to stop supplying power to the power supply terminal when it is determined that a signal received by the power supply management module changes from a second control signal into a first control signal.

9 Claims, 4 Drawing Sheets

(51) Int. Cl.
*H04B 1/3816* (2015.01)
*H01R 12/71* (2011.01)
*H01R 13/66* (2006.01)
*H04M 1/274* (2006.01)
*G06K 7/00* (2006.01)

(56) References Cited

U.S. PATENT DOCUMENTS

| | | | | |
|---|---|---|---|---|
| 5,743,766 A | * | 4/1998 | Kaneshige | G06K 7/0021 235/441 |
| 6,397,081 B1 | * | 5/2002 | Franck | H04B 1/3816 455/347 |
| 7,540,766 B2 | * | 6/2009 | Makinson | G01R 22/065 439/517 |
| 7,611,386 B1 | * | 11/2009 | Zhang | H01R 12/725 439/660 |
| 8,577,415 B2 | * | 11/2013 | Zhao | H04B 1/48 455/558 |
| 2005/0233640 A1 | * | 10/2005 | Kutsch | H04Q 1/15 439/607.05 |

FOREIGN PATENT DOCUMENTS

| | | |
|---|---|---|
| CN | 102945189 A | 2/2013 |
| CN | 103001075 A | 3/2013 |
| JP | 2012-256530 A | 12/2012 |

OTHER PUBLICATIONS

English Abstract of CN102945189 A.
English Abstract of JP2012-256530 A.
English Abstract of CN101777709 A.
English translation of CN103001075 A.
English translation of CN102945189 A.
English translation of JP2012-256530 A.
English translation of CN101777709 A.

* cited by examiner

SIM CARD CONNECTOR AND MOBILE TERMINAL

RELATED APPLICATION

This application is a national phase entry under 35 USC 371 of international Patent Application No PCT/CN2013/080836 filed on 5 Aug. 2013, which claims priority from Chinese Patent Application No, 201310191088.5 filed on 21 May 2013, the disclosures of which are incorporated in their entirety by reference herein.

FIELD OF THE INVENTION

The present disclosure generally relates to the technical field of circuit designing, and more particularly, to an SIM card connector and also a mobile terminal.

BACKGROUND OF THE INVENTION

An SIM (Subscriber Identity Module) card stores information of a user of the corresponding digital mobile terminal, a key for encryption, a telephone book of the user and so on. The mobile terminal can be used by the user for communication only when the SIM card is plugged therein.

The SIM card is provided with metal contacts, which connect with terminals of an SIM card connector of the mobile terminal to allow for communication. When the SIM card is completely plugged into the SIM card connector, each of the metal contacts connects to just one terminal. However, in the process of plugging the SIM card into or removing the SIM card from the SIM card connector, it is likely that some terminals of the SIM card connector connect to more than one metal contact simultaneously. If, in this case, the SIM card connector is still kept energized, there will be a risk of damaging the SIM card due to a short-circuit. For example, refer to FIG. 1, which is a schematic view illustrating operations of plugging or removing the SIM card in the prior art. After the SIM card 10 is completely plugged into the SIM card connector (not shown), the metal contacts 101 of the SIM card 10 are in one-to-one correspondence with the terminals 102 of the SIM card connector. In the process of removing the SIM card 10, it is likely that one terminal 102 connects to two metal contacts 101 simultaneously because of the large touch areas between the terminal 102 and the metal contacts 101. If, in this case, the terminal 102 is still connected with the power supply, then the SIM card 10 will be short-circuited.

In mobile terminals of the early stage, the structure design is such that the battery can be installed only after the SIM card has been plugged and, on the other hand, the SIM card can be removed only after the battery has been removed, so there is no risk of short-circuit of the SIM card. However, as the mobile terminals are developing towards an integrated form, built-in batteries have become a general trend. Correspondingly, there might be cases where the SIM card is hot plugged in or removed with the mobile terminal being powered on.

SUMMARY OF THE INVENTION

A primary objective of the present disclosure is to provide an SIM card connector and a mobile terminal which can support hot plug-in and removal of an SIM card.

To solve the aforesaid technical problem, a solution adopted by the present disclosure is as follows: a mobile terminal, which comprises an AND gate circuit, a power supply management module and an SIM card connector for connecting an SIM card, wherein: the SIM card connector comprises a card holder as well as a power supply terminal, a first terminal and a second terminal disposed within the card holder, the SIM card is plugged into or removed from the card holder along a fixed direction, the second terminal is spaced apart from the first terminal by a first predetermined distance of 0.3 mm along the fixed direction, and the first terminal is spaced apart from the power supply terminal by a second predetermined distance along the fixed direction; wherein the power supply terminal, the first terminal and the second terminal are all used to connect with a power supply contact of the SIM card, and when the SIM card is plugged, the power supply terminal connects with the power supply contact earlier than the first terminal, and the first terminal connects with the power supply contact earlier than the second terminal; and when the SIM card is removed, the second terminal is disconnected from the power supply contact earlier than the first terminal; the power supply management module is configured to, when the SIM card is plugged in a powered-on state of the mobile terminal, supply power to the power supply terminal so that the SIM card connector communicates with the SIM card; the AND gate circuit is configured to detect whether levels at the first terminal and the second terminal are a predetermined level, and if it is detected that neither of the levels is the predetermined level, then transmit a low level to the power supply management module, and otherwise, transmit a high level to the power supply management model, wherein the levels at the first terminal and the second terminal are the predetermined level only when they connect to the power supply contact; and the power supply management module is further configured to supply power to the power supply terminal when it is detected that a signal received changes from the low level into the high level; and stop supplying power to the power supply terminal when it is detected that the signal received changes from the high level into the low level on as to prevent short-circuit of the SIM card when the SIM card is removed in a powered-on state of the mobile terminal.

To solve the aforesaid technical problem, another solution adopted by the present disclosure is as follows: an SIM card connector for connecting an SIM card, wherein the SIM card connector comprises a card holder as well as a power supply terminal, a first terminal and a second terminal disposed within the card holder, the SIM card is plugged into or removed from the card holder along a fixed direction, the second terminal is spaced apart from the first terminal by a first predetermined distance along the fixed direction, and the first terminal is spaced apart from the power supply terminal by a second predetermined distance along the fixed direction; and wherein the power supply terminal, the first terminal and the second terminal are all used to connect with a power supply contact of the SIM card, and when the SIM card is plugged, the power supply terminal connects with the power supply contact earlier than the first terminal, and the first terminal connects with the power supply contact earlier than the second terminal; and when the SIM card is removed, the second terminal is disconnected from the power supply contact earlier than the first terminal.

The first predetermined distance is smaller than 1 mm.

The first predetermined distance is 0.3 mm.

To solve the aforesaid technical problem, yet another solution adopted by the present disclosure is as follows: a mobile terminal, which comprises an interruption detection module, a power supply management module and any of the aforesaid SIM card connectors, wherein the power supply management module is configured to, when the SIM card is plugged in a powered-on state of the mobile terminal, supply power to the power supply terminal so that the SIM card connector communicates with the SIM card; the interruption detection module is configured to detect whether levels at the first terminal and the second terminal are a predetermined level, and if it is detected that neither of the levels is the predetermined level, then transmit a first control signal to the power supply management module, and otherwise, transmit a second control signal to the power supply management module, wherein the levels at the first terminal and the second terminal are the predetermined level only when they connect to the power supply contact; and the power supply management module is further configured to supply power to the power supply terminal when it is detected that a signal received changes from the first control signal into the second control signal, and stop supplying power to the power supply terminal when it is detected that the signal received changes from the second control signal into the first control signal so as to prevent short-circuit of the SIM card when the SIM card is removed in a powered-on state of the mobile terminal.

The predetermined level is a high level, the first control signal is a low level, the second control signal is the high level, and the interruption detection module is an AND gate circuit.

The predetermined level is a high level, the first control signal is the high level, the second control signal is a low level, and the interruption detection module is an NAND gate circuit.

The first predetermined distance is smaller than 1 mm.

The first predetermined distance is 0.3 mm.

The present disclosure has the following benefits: as compared to the prior art, the SIM card connector and the mobile terminal of the present disclosure are provided with a first terminal, a second terminal and a power supply terminal in the SIM card connector, which are all connected to the power supply contact of the SIM card; when the SIM card is plugged, the power supply terminal, the first terminal and the second terminal connect to the power supply contact sequentially; when it is detected that neither of the levels at the first terminal and the second terminal is a predetermined level, the interruption detection module transmits the first control signal to the power supply management module, and otherwise, transmits the second control signal to the power supply management module; and if it is detected that a signal received changes from the second control signal into the first control signal, the power supply module stops supplying power to the power supply terminal, and the levels at the first terminal and the second terminal are the predetermined level only when they connect to the power supply contact. Thereby, the goal of cutting off the power supply when the SIM card is removed can be achieved, thus solving the technical problem that the prior art cannot support hot plug-in and removal of the SIM card and preventing short-circuit of the SIM card when the SIM card is removed in a powered-on state of the mobile terminal.

DETAILED DESCRIPTION OF THE INVENTION

Hereinbelow, technical solutions of embodiments of the present disclosure will be described clearly and completely with reference to the attached drawings. Obviously, embodiments described herein are only some of but not all of the embodiments of the present disclosure. All other embodiments that can be obtained without making inventive efforts by those of ordinary skill in the art upon reviewing the disclosures of the embodiments of the present disclosure shall fall within the scope of the present disclosure.

Figure 1:
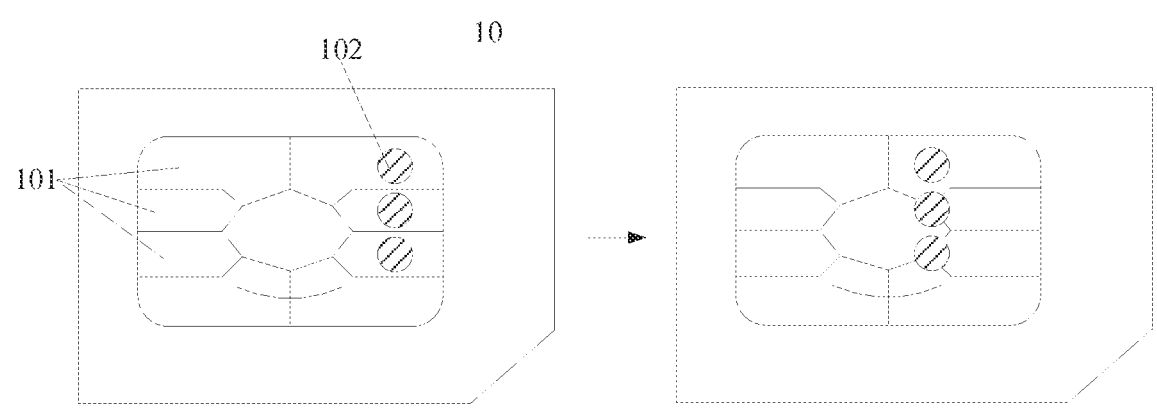
FIG. 1 is a schematic view illustrating operations of plugging and removing an SIM card in the prior art.
Figure 2:
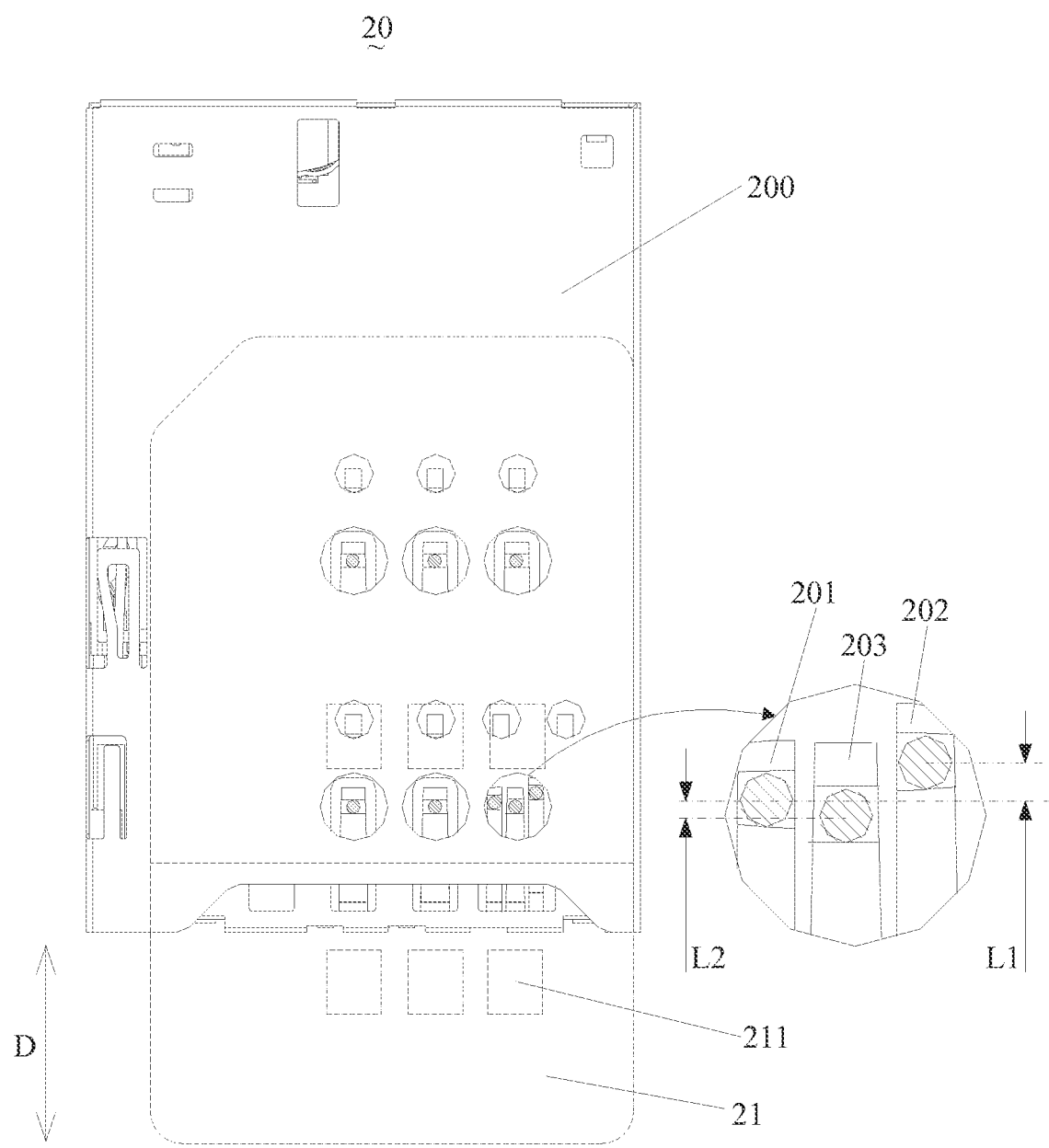
FIG. 2 is a schematic structural view of an embodiment of an SIM card connector according to the present disclosure.

Referring to FIG. 2, there is shown a schematic structural view of an embodiment of an SIM card connector according to the present disclosure. This figure shows not only a partially enlarged structure of a card holder 200 but also an SIM card 21. The SIM card is shown by dashed lines in order to clearly show the structure of the card holder 200.

The SIM card connector 20 comprises the card holder 200 as well as a first terminal 201, a second terminal 202 and a power supply terminal 203 disposed within the card holder 200. The first terminal 201, the second terminal 202 and the power supply terminal 203 are all used to connect with a power supply contact 211 of the SIM card 21. Generally speaking, a plurality of conductive terminals are disposed within the card holder 200 in one-to-one correspondence with a plurality of conductive contacts on the SIM card 21, and the first terminal 201, the second terminal 202 and the power supply terminals 203 are just apart of these conductive terminals. Similarly, the power supply contact 211 of the SIM card 21 is one of the conductive contacts and acts as a power supply input terminal of the SIM card 21. The SIM card 21 can operate when there is a power supply input at the power supply contact 211.

The SIM card 21 is plugged into or removed from the card holder 200 along a fixed direction D, the second terminal 202 is spaced apart from the first terminal 201 by a first predetermined distance L1 along the fixed direction, and the first terminal 201 is spaced apart from the power supply terminal 203 by a second predetermined distance L2 along the fixed direction. In this embodiment, the first predetermined distance L1 is less than 1 mm, and preferably is 0.3 mm.

Figure 3:
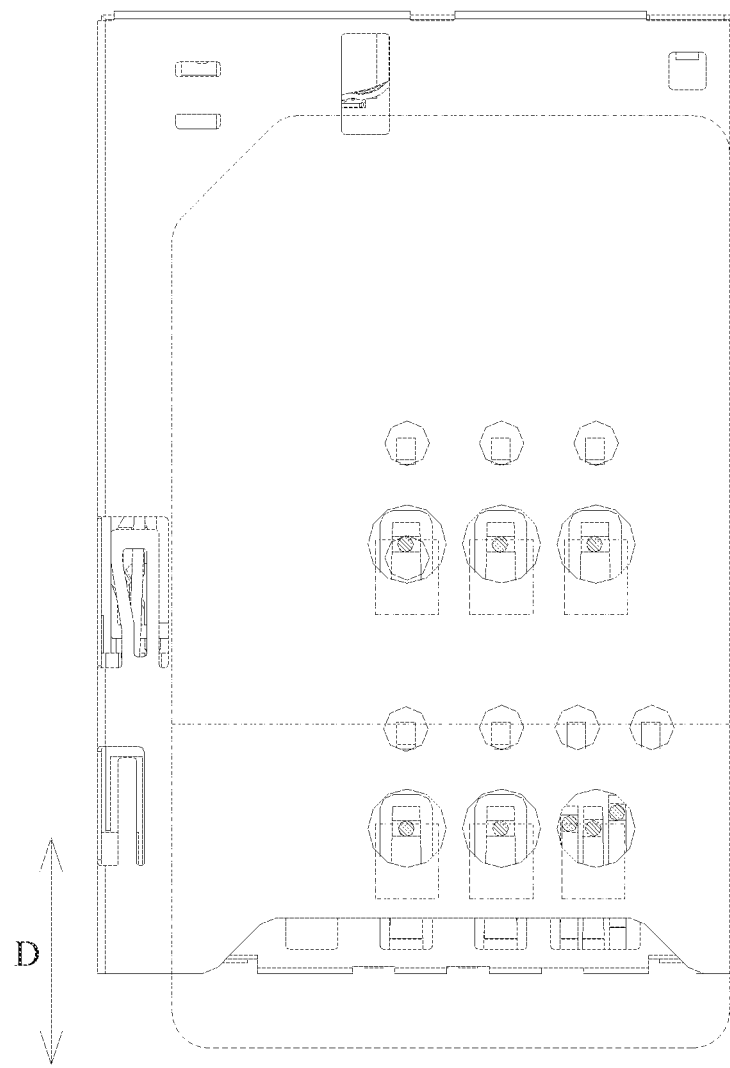
FIG. 3 is a schematic view illustrating operations of plugging an SIM card into and removing the SIM card from the SIM card connector shown in FIG. 2.

Referring to FIG. 3, there is shown a schematic view illustrating operations of plugging an SIM card into and removing the SIM card from the SIM card connector shown in FIG. 2. As can be seen, in the process of plugging the SIM card 21, the power supply terminal 203 connects with the power supply contact 211 earlier than the first terminal 201, and the first terminal 201 connects with the power supply contact 211 earlier than the second terminal 202; and conversely, in the process of removing the SIM card 21, the second terminal 202 is disconnected from the power supply contact 211 earlier than the first terminal 201, and the first terminal 201 is disconnected from the power supply contact 211 earlier than the power supply terminal 203.

Figure 4:
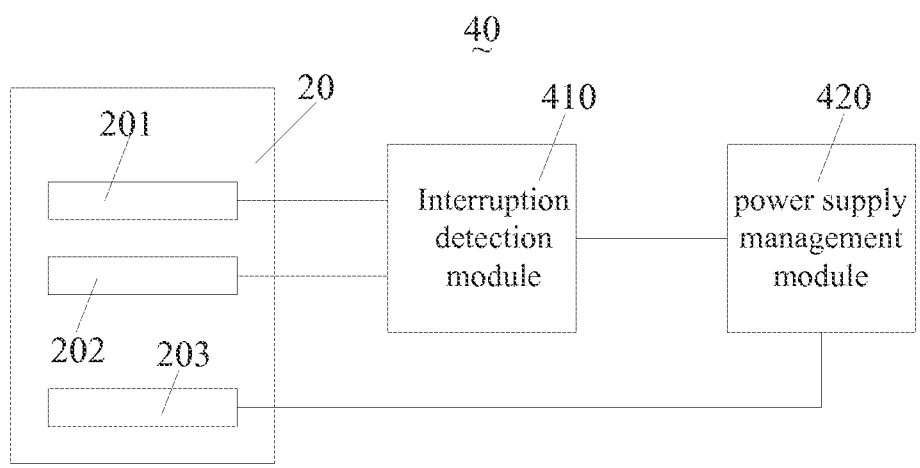
FIG. 4 is a schematic structural view of an embodiment of a mobile terminal according to the present disclosure.

Referring to FIG. 4, there is shown a schematic structural view of an embodiment of the mobile terminal according to the present disclosure. The mobile terminal 40 comprises an interruption detection module 410, a power supply management module 420 and an SIM card connector 20 according to the aforesaid embodiment. In this embodiment, the mobile terminal 40 is an electronic device such as a mobile phone, a tablet computer or a personal digital assistant (PDA).

The Dower supply management module 420 is electrically coupled to the power supply terminal 203 of the SIM card connector 20, and configured to, when the SIM card 21 is plugged in a powered-on state of the mobile terminal 40, supply power to the power supply terminal 203 so that the SIM card connector 20 communicates with the SIM card 21.

The interruption detection module 410 is electrically coupled to the first terminal 201 and the second terminal 202 of the SIM card connector 20, and configured to detect whether levels at the first terminal 201 and the second terminal 202 are a predetermined level. If it is detected that neither of the levels is the predetermined level, then the interruption detection module 410 transmits a first control signal to the power supply management module 420, and otherwise, transmits a second control signal to the power supply management module 420. The levels at the first terminal 201 and the second terminal 202 are the predetermined level only when they connect to the power supply contact 211.

The power supply management module 420 is further electrically coupled to the interruption detection module 410, and configured to supply power to the power supply terminal 203 when it is detected that a signal received changes from the first control signal into the second control signal; and stop supplying power to the power supply terminal 203 when it is detected that the signal received changes from the second control signal into the first control signal so as to prevent short-circuit of the SIM card 21 when the SIM card 21 is removed in a powered-on state of the mobile terminal 40.

In this embodiment, the predetermined level is a high level, the first control signal is a low level, the second control signal is the high level, and the interruption detection module 410 is an AND gate circuit. The two input terminals of the AND gate circuit are the first terminal 201 and the second terminal 202, and an output terminal of the AND gate circuit is connected to the power supply management module 420.

Hereinbelow, a specific operation process of the mobile terminal 40 in the process of hot plug-in and removal of the SIM card 21 will be detailed.

When the mobile terminal 40 is powered on but the SIM card 21 has not been plugged in, both the first terminal 201 and the second terminal 202 are at a low level. However, because the mobile terminal 40 has just been powered on, the power supply management module 420 may supply power to the power supply terminal 203 as a default setting, and of course, it may also not supply power to the power supply terminal 203.

In the process of plugging the SIM card 21, when the first terminal 201 connects to the power supply contact 211 but the second terminal 202 has not connected to the power supply contact 211 yet, the first terminal 201 is at a high level and the second terminal 202 is at a low level. In this case, the AND gate circuit outputs a low level, and the power supply management module 420 still keeps supplying power to the power supply terminal 203.

After the SIM card 21 has been completely plugged, both the first terminal 201 and the second terminal 202 connect to the power supply contact 211 (equivalent to a connection with the power supply terminal 203), and both the first terminal 201 and the second terminal 202 are at a high level. In this case, the AND gate circuit outputs a high level. Correspondingly, the power supply management module 420 detects that a signal received changes from the low level into the high level, so it still keeps supplying power to the power supply terminal 203.

In the process of removing the SIM card 21, when the second terminal 202 is disconnected from the power supply contact 211 but the first terminal 201 is still connected to the power supply contact 211, the first terminal 201 is at a high level and the second terminal 202 is at a low level. In this case, the AND gate circuit outputs a low level. Correspondingly, the power supply management module 420 detects that the signal received changes from the high level into the low level, so it stops supplying power to the power supply terminal 203.

After the SIM card 21 has been completely removed, both the first terminal 201 and the second terminal 202 are disconnected from the power supply contacts 211 and are both at a low level. In this case, the AND gate circuit outputs a low level, and correspondingly, the power supply management module 420 does not supply power to the power supply terminal 203 yet.

Because the first predetermined distance L1 is very small, the power supply terminal 203 loses the power input immediately at the instant that the SIM card 21 is removed. In this way, short-circuit of the SIM card 21 when the SIM card 21 is removed in a powered-on state of the mobile terminal 40 can be prevented.

It shall be noted that, when the mobile terminal 40 is initially powered on, short-circuit of the SIM card 21 will not be caused when the SIM card 21 is plugged regardless of whether the power supply management module 420 supplies power to the power supply terminal 203. According to the standard structure design of the SIM card 21, the power supply contact 211 connects to the power supply terminal 203 of the SIM card connector 20 the latest among the conductive contacts of the SIM card 21. That is to way, even if the power supply terminal 203 connects to two conductive contacts simultaneously in the process of plugging the SIM card 21, there is still no power input to the SIM card 21 because the power supply contact 211 does not connect to the power supply terminal 203 and, thus, the SIM card 21 will not be short-circuited.

Further, in other embodiments, the predetermined level is a high level, the first control signal is the high level, the second control signal is a low level, and the interruption detection module is an NAND gate circuit. In this case, the specific operation process of the mobile terminal 40 is similar to the aforesaid process, so it will not be further detailed herein.

According to the above descriptions, the SIM card connector and the mobile terminal of the present disclosure are provided with a first terminal, a second terminal and a power supply terminal in the SIM card connector, which are all connected to the power supply contact of the SIM card. When the SIM card is plugged, the power supply terminal, the first terminal and the second terminal connect to the power supply contact sequentially. When it is detected that neither of the levels at the first terminal and the second terminal is a predetermined level, the interruption detection module transmits the first control signal to the power supply management module, and otherwise, transmits the second control signal to the power supply management module. If it is detected that a signal received changes from the second control signal into the first control signal, the power supply module stops supplying power to the power supply terminal, and the levels at the first terminal and the second terminal are the predetermined level only when they connect to the power supply contact. Thereby, the goal of cutting off the power supply when the SIM card is removed can be achieved, thus solving the technical problem that the prior art cannot support hot plug-in and removal of the SIM card and preventing short-circuit of the SIM card when the SIM card is removed in a powered-on state of the mobile terminal.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A mobile terminal, comprising an AND gate circuit, a power supply management module and an SIM card connector for connecting an SIM card, wherein:

the SIM card connector comprises a card holder as well as a power supply terminal, a first terminal and a second terminal disposed within the card holder, the SIM card is plugged into or removed from the card holder along a fixed direction, the second terminal is spaced apart from the first terminal by a first predetermined distance of 0.3 mm along the fixed direction, and the first terminal is spaced apart from the power supply terminal by a second predetermined distance along the fixed direction; wherein the power supply terminal, the first terminal and the second terminal are all used to connect with a power supply contact of the SIM card, and when the SIM card is plugged, the power supply terminal connects with the power supply contact earlier than the first terminal, and the first terminal connects with the power supply contact earlier than the second terminal; and when the SIM card is removed, the second terminal is disconnected from the power supply contact earlier than the first terminal;

the power supply management module is configured to, when the SIM card is plugged in a powered-on state of the mobile terminal, supply power to the power supply terminal so that the SIM card connector communicates with the SIM card;

the AND gate circuit is configured to detect whether levels at the first terminal and the second terminal are a predetermined level, and if it is detected that neither of the levels is the predetermined level, then transmit a low level to the power supply management module, and otherwise, transmit a high level to the power supply management module, wherein the levels at the first terminal and the second terminal are the predetermined level only when they connect to the power supply contact; and the power supply management module is further configured to supply power to the power supply terminal when it is detected that a signal received changes from the low level into the high level; and stop supplying power to the power supply terminal when it is detected that the signal received changes from the high level into the low level so as to prevent short-circuit of the SIM card when the SIM card is removed in a powered-on state of the mobile terminal.

2. An SIM card connector for connecting an SIM card, wherein the SIM card connector comprises a card holder as well as a power supply terminal, a first terminal and a second terminal disposed within the card holder, the SIM card is plugged into or removed from the card holder along a fixed direction, the second terminal is spaced apart from the first terminal by a first predetermined distance along the fixed direction, and the first terminal is spaced apart from the power supply terminal by a second predetermined distance along the fixed direction;

and wherein the power supply terminal, the first terminal and the second terminal are all used to connect with power supply contact of the SIM card, power is supplied to the power supply terminal, and when the SIM card is plugged, the power supply terminal connects with the power supply contact earlier than the first terminal, so as to control the power supply contact being at a high level as same as the power supply terminal, and the first terminal and the second terminal being at a low level; and the first terminal connects with the power supply contact earlier than the second terminal, so as to control the first terminal being at a high level as same as the power supply terminal through the power supply contact, and the second terminal being at a low level; and when the SIM card is removed, the second terminal is disconnected from the power supply contact earlier than the first terminal, so as to control the first terminal being at a high level as same as the power supply terminal through the power supply contact, and the second terminal being at a low level.

3. The SIM card connector of claim 2, wherein the first predetermined distance is smaller than 1 mm.

4. The SIM card connector of claim 3, wherein the first predetermined distance is 0.3 mm.

5. A mobile terminal, comprising an interruption detection module, a power supply management module and an SIM card connector for connecting an SIM card, wherein:

the SIM card connector comprises a card holder as well as a power supply terminal, a first terminal and a second terminal disposed within the card holder, the SIM card is plugged into or removed from the card holder along a fixed direction, the second terminal is spaced apart from the first terminal by a first predetermined distance of 0.3 mm along the fixed direction, and the first terminal is spaced apart from the power supply terminal by a second predetermined distance along the fixed direction; wherein the power supply terminal, the first terminal and the second terminal are all used to connect with a power supply contact of the SIM card, and when the SIM card is plugged, the power supply terminal connects with the power supply contact earlier than the first terminal, and the first terminal connects with the power supply contact earlier than the second terminal; and when the SIM card is removed, the second terminal is disconnected from the power supply contact earlier than the first terminal;

the power supply management module is configured to, when the SIM card is plugged in a powered-on state of the mobile terminal, supply power to the power supply terminal so that the SIM card connector communicates with the SIM card;

the interruption detection module is configured to detect whether levels at the first terminal and the second terminal are a predetermined level, and if it is detected that neither of the levels is the predetermined level, then transmit a first control signal to the power supply management module, and otherwise, transmit a second control signal to the power supply management module, wherein the levels at the first terminal and the second terminal are the predetermined level only when they connect to the power supply contact; and the power supply management module is further configured to supply power to the power supply terminal when it is detected that a signal received changes from the first control signal into the second control signal; and stop supplying power to the power supply terminal when it is detected that the signal received changes from the second control signal into the first control signal so as to prevent short-circuit of the SIM card when the SIM card is removed in a powered-on state of the mobile terminal.

6. The mobile terminal of claim 5, wherein the predetermined level is a high level, the first control signal is a low level, the second control signal is the high level, and the interruption detection module is an AND gate circuit.

7. The mobile terminal of claim 5, wherein the predetermined level is a high level, the first control signal is the high level, the second control signal is a low level, and the interruption detection module is an NAND gate circuit.

8. The mobile terminal of claim 5, wherein the first predetermined distance is smaller than 1 mm.

9. The mobile terminal of claim 5, wherein the first predetermined distance is 0.3 mm.

* * * * *